Nov. 22, 1966 V. J. CUSHING 3,286,522
MAGNETOELECTRIC FLOWMETER APPARATUS
Filed Aug. 13, 1963 5 Sheets-Sheet 1

INVENTOR
VINCENT J. CUSHING
BY Shoemaker and Mattare
ATTORNEYS

Nov. 22, 1966   V. J. CUSHING   3,286,522
MAGNETOELECTRIC FLOWMETER APPARATUS
Filed Aug. 13, 1963   5 Sheets-Sheet 2

INVENTOR
VINCENT J. CUSHING
BY Shoemaker and Mattare
ATTORNEYS

Nov. 22, 1966 V. J. CUSHING 3,286,522
MAGNETOELECTRIC FLOWMETER APPARATUS
Filed Aug. 13, 1963 5 Sheets-Sheet 3

INVENTOR
VINCENT J. CUSHING
BY Shoemaker and Mattare
ATTORNEYS

Nov. 22, 1966  V. J. CUSHING  3,286,522
MAGNETOELECTRIC FLOWMETER APPARATUS
Filed Aug. 13, 1963  5 Sheets-Sheet 4
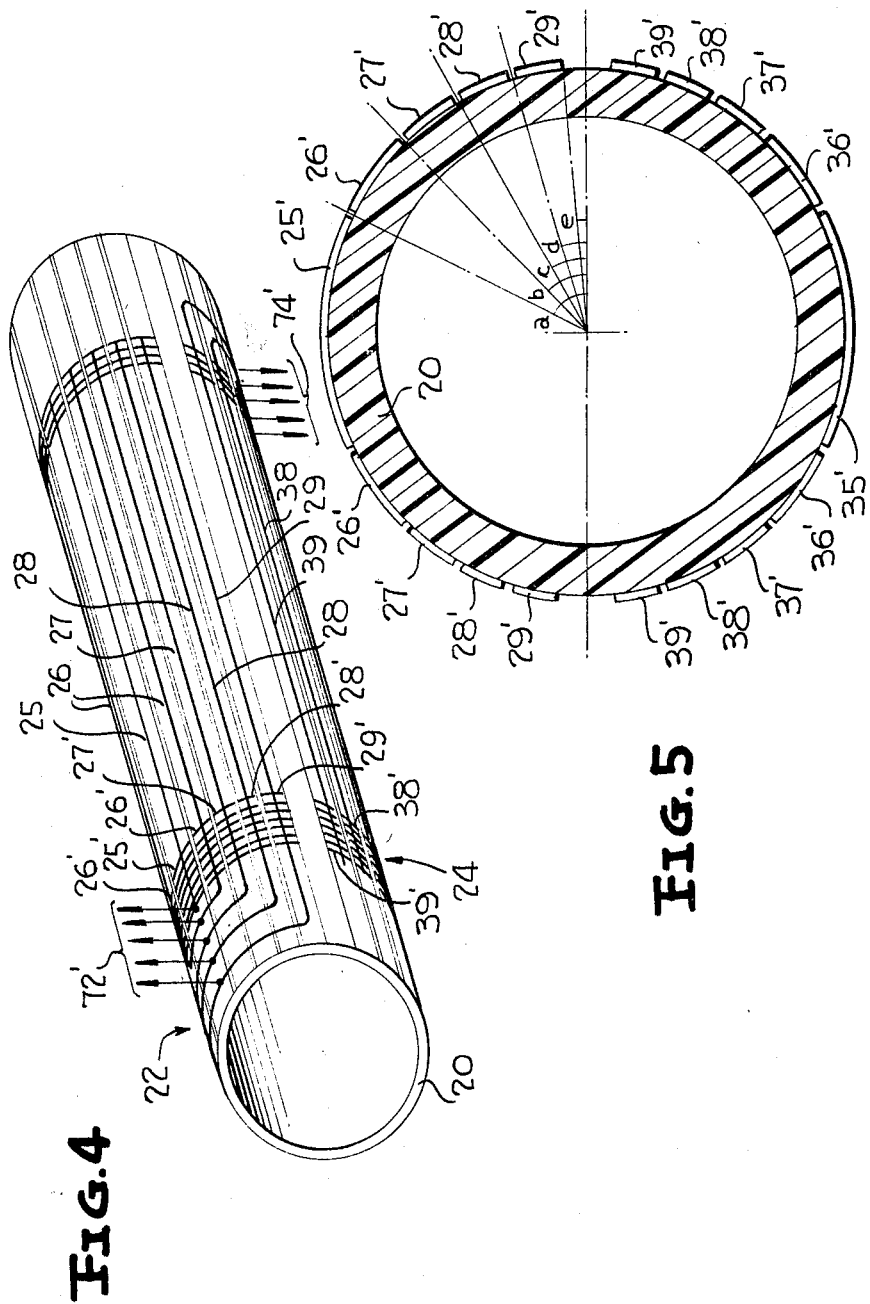
INVENTOR
VINCENT J. CUSHING
BY Shoemaker and Mattare
ATTORNEYS Nov. 22, 1966  V. J. CUSHING  3,286,522
MAGNETOELECTRIC FLOWMETER APPARATUS
Filed Aug. 13, 1963  5 Sheets-Sheet 5
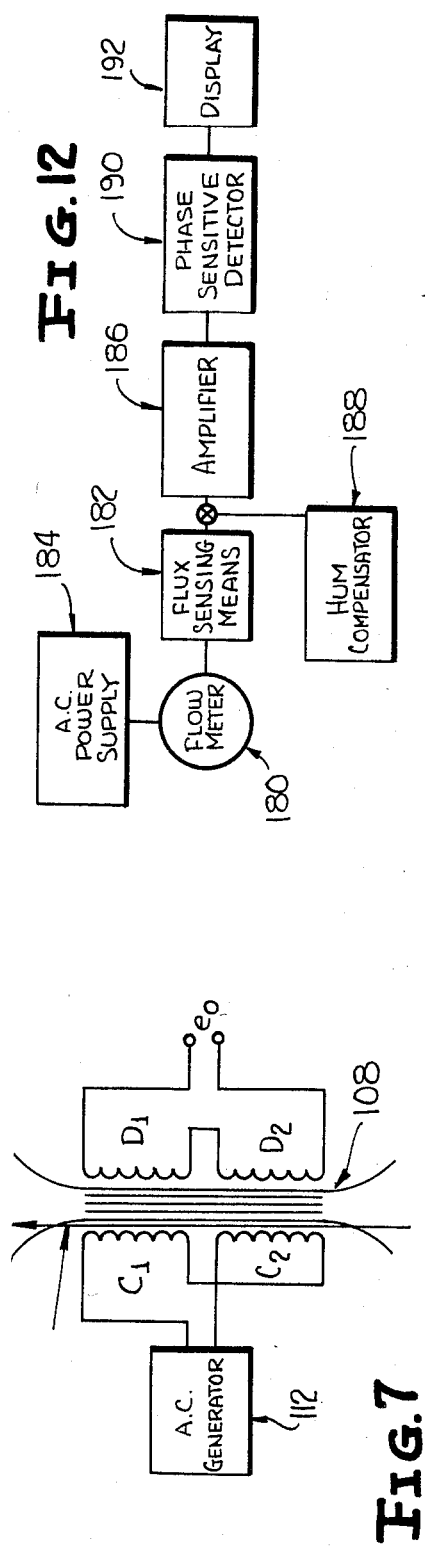
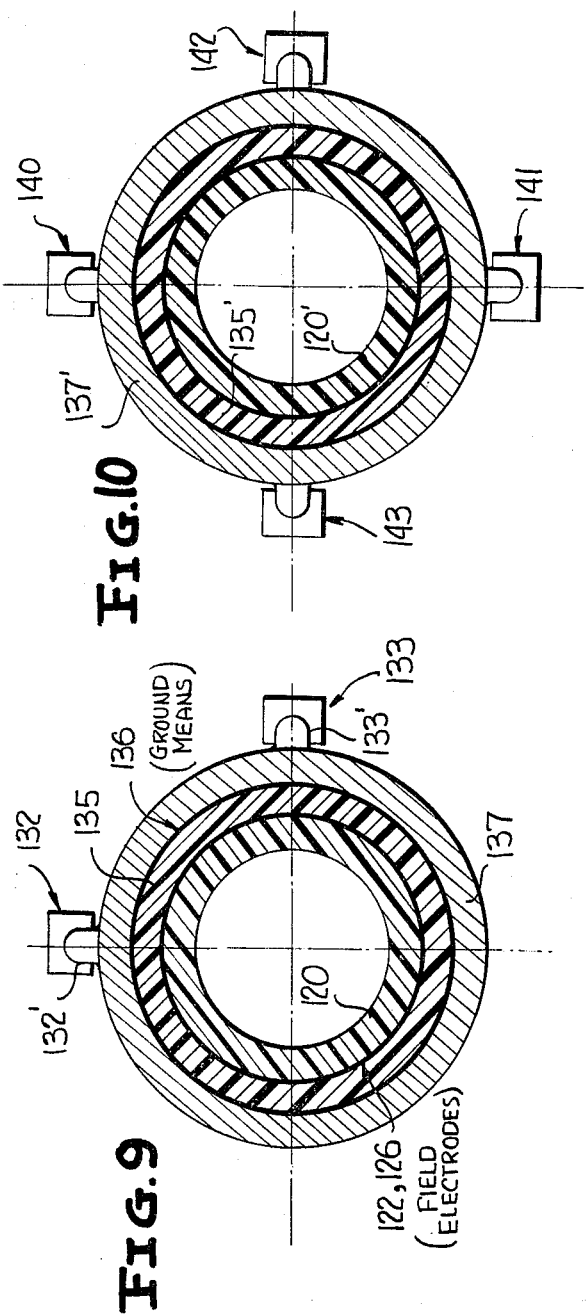
INVENTOR
VINCENT J. CUSHING
BY Shoemaker and Mattare
ATTORNEYS United States Patent Office 3,286,522
Patented Nov. 22, 1966

3,286,522
MAGNETOELECTRIC FLOWMETER APPARATUS
Vincent J. Cushing, 9804 Hillridge Drive,
Kensington, Md.
Filed Aug. 13, 1963, Ser. No. 301,865
19 Claims. (Cl. 73—194)

The present invention relates to new and novel magnetoelectric flowmeter apparatus, and more particularly to a flowmeter apparatus which is especially adapted for use with dielectric fluids.

Flowmeters of the electromagnetic type have been used for some time with electrically conducting fluids, but these types of flowmeters have not been successfully utilized with dielectric fluids. Such fluids include cyrogenic propellants such as liquid oxygen and liquid hydrogen, as well as petroleum products of almost all types and a great variety of chemicals in their fluid state and in nonionizing solutions.

Flowmeters are utilized with these types of fluids in many different applications such as, for example, the production, refining, transportation, and utilization of petroleum products, in the petro-chemicals industry, in the production of plastic resins, in the commercial oxygen industry and in the industries which use cryogenic fluids in various commercial purposes.

Prior art flowmeters utilized for the measurement of flow of dielectric fluids have utilized various arrangements which have proved unsatisfactory for a number of reasons. The flowmeters utilized with such nonconducting fluids have generally employed turbine wheels, probes and similar arrangements which obstruct the free flow of fluid through the flowmeter and which further produce undesirable pressure drops in the fluid line.

The present invention overcomes these disadvantages of the prior art in providing an arrangement which employs no moving parts and which affords a completely unobstructed flow passage through the apparatus, there being no probe or any other means which protrudes into the fluid or disturbs the fluid flow in any way. There is virtually no pressure drop created by the apparatus of the present invention in the measured fluid, and non-homogeneous fluids such as slurries can be utilized with the apparatus. Furthermore, flowmeters of the type of the present invention provide an extremely sensitive response to flow oscillations inasmuch as there are no moving parts in the apparatus.

The present invention utilizes a completely new concept in the field of flow measurement wherein a substantially uniform (or, alternatively, a constant R.M.S. value alternating) electric field is established transverse to or substantially perpendicular to the direction of flow of a dielectric fluid within a suitable conduit means. It is well established that a dielectric fluid flowing through a transverse electric field generates a magnetic moment in the fluid, and this invention is based on the recently discovered fact that this generated magnetic moment gives rise to a magnetic flux which is directly proportional to volumetric flow rate through the conduit means regardless of velocity profile, provided that the velocity profile is substantially axially symmetric. The magnetic flux thus induced can be measured by suitable means as hereinafter set forth. The theory of the present invention will be more completely discussed hereinafter.

In the present invention, the conduit means may comprise a suitable tubular member which is preferably formed of a dielectric material. Means is provided for producing a substantially uniform transverse electric field within the conduit means, and a plurality of electrodes are provided for this purpose. These electrodes are spaced and insulated from one another and in a typical example may be disposed at opposite sides of the conduit means. The electrodes preferably extend longitudinally of the elongated conduit means and are formed of electrically conductive non-magnetic portions. In order to minimize eddy current losses, the electrodes may also define a gridwork, or in other words may be comprised of a plurality of portions the major parts of which are insulated from one another.

In addition, the electrodes may comprise a novel arrangement so as to assure a substantially uniform electric field within the conduit means. This arrangement of the electrodes includes a construction wherein each of the electrodes comprises not only a longitudinally extending portion but a plurality of peripherally extending portions which extend peripherally of the associated conduit means. These peripherally extending portions may be of different peripheral length so as to provide the desired results as hereinafter more fully described.

Magnetic sensing means is disposed adjacent to the conduit means but in spaced relationship thereto as well as in spaced relation to the field electrodes which are preferably disposed on the outer surface of the conduit means so as not to interfere in any way with the flow of fluid through the conduit means. The magnetic sensing means preferably includes a body means formed of magnetic permeable material which extends substantially completely around the conduit means and a field electrode so as to form a flux collecting means to assure that the magnetic sensing means detects substantially all of the flux developed by the fluid flowing through the electric field. In certain forms of the invention, the magnetic permeable material may take a particular configuration so as to concentrate the flux in a particular area to facilitate detection of the flux.

The electric field employed in the present invention may be generated either by an A.C. or a D.C. electrical source, and the magnetic sensing means may take the form either of an induction coil which may be employed where an A.C. electrical source is employed, or alternatively the magnetic sensing means may take the form of a conventional magnetometer when either an A.C. or a D.C. source of electrical potential is employed. It should also be understood that various other forms of a conventional magnet sensing means may be employed with the present invention.

In a further form of the invention, the field electrodes may be so arranged and energized as to produce a rotating electric field, and a plurality of magnetic sensing means may be employed for detecting the magnetic flux where a rotating electric field is employed.

The present invention additionally incorporates a ground means which is disposed between the field electrodes and the magnetic sensing means, this ground means serving to shield the magnetic permeable material and magnetic flux sensing means from any deleterious effects of the electric fields. The ground means is preferably disposed in substantially surrounding relationship to the conduit means and the field electrodes, the ground means being spaced from and insulated from both the field electrodes and the magnetic sensing means. The ground means is formed of electrically conductive nonmagnetic material and perferably takes the form of a plurality of spaced portions the major parts of which are insulated from one another and which extend longitudinally of the conduit means and substantially parallel with the longitudinal axis thereof.

In certain forms of the invention, a single ground means is employed, and in an alternative arrangement a plurality of concentric ground means may be utilized for enhancing the desired shielding effect.

The over-all combination of the components as discussed above is such that the fluid flowing through the transverse uniform electric field induces magnetic flux, the so generated magnetic field passing out through the electric field electrodes and through the ground means and closes on the magnetic permeable material of the magnetic sensing means. Since the lines of induced magnetic flux must be closed, all of the flux gathered by the magnetic permeable material then passes through a region adjacent to a suitable magnetic flux sensing device for detecting the magnetic flux.

It will be understood that the spaced portions of the field electrodes as well as the ground means will serve to reduce any eddy current losses and further will provide a minimum attenuation of the magnetic field induced by the flowing fluid.

In a perferred form of the invention, the conduit means may be of substantially circular cross-sectional configuration, and in such an instance, the field electrodes as well as the ground means and the magnetic sensing means including the body of magnetic permeable material may all be of generally curvilinear configuration, the various components being disposed in substantially concentric relationship with one another. The various aforementioned components are also designed to extend through a substantially large area so as to increase the effectiveness and efficiency of operation of the apparatus.

An object of the present invention is to provide magnetoelectric flowmeter apparatus which may be utilized with dielectric fluids.

Another object of the invention is the provision of magnetoelectric flowmeter apparatus which has no moving parts and which provides in unobstructed flow passage for fluid therethrough.

Still another object of the invention is to provide magnetoelectric flowmeter apparatus which produces virtually no pressure drop in the measured fluid, which has a linear response, and further which is extremely sensitive to flow oscillations.

Yet another object of the present invention is to provide magnetoelectric flowmeter apparatus including means for eliminating the problem of asymmetric fluid flow.

Still another object of the invention is the provision of magnetoelectric flowmeter apparatus including means for collecting and measuring substantially all of the magnetic flux developed by the apparatus.

Yet another object of the invention is to provide magnetoelectric flowmeter apparatus including means for shielding the magnetic collecting and measuring means from any deleterious effects of the electric field employed in the apparatus.

A still further object of the invention is the provision of magnetoelectric flowmeter apparatus which is quite simple and inexpensive and compact in construction and which further is efficient and reliable in operation.

Other objects and many attendant advantages of the invention will become more apparent when considered in connection with the specification and accompanying drawings, wherein:

FIG. 4 is a perspective view of the conduit means of the apparatus shown in FIG. 1 and illustrates the manner in which the field electrodes are disposed on the outer periphery of the conduit means;

FIG. 5 is a sectional view taken through the conduit means of FIG. 4 on an enlarged scale and specifically illustrating the peripheral extent of the field electrodes;

FIG. 6 is a sectional view through a modified form of the invention;

FIG. 7 illustrates in a diagramatic manner a form of magnetic sensing means utilized in the present invention;

FIG. 9 is a cross-sectional view of an arrangement of the flowmeter apparatus as utilized with a rotating field;

FIG. 10 is a further modified form of the flowmeter apparatus as utilized with a rotating field;

FIG. 12 is a diagramatic view of a typical electrical circuit according to the present invention.

Figure 1:
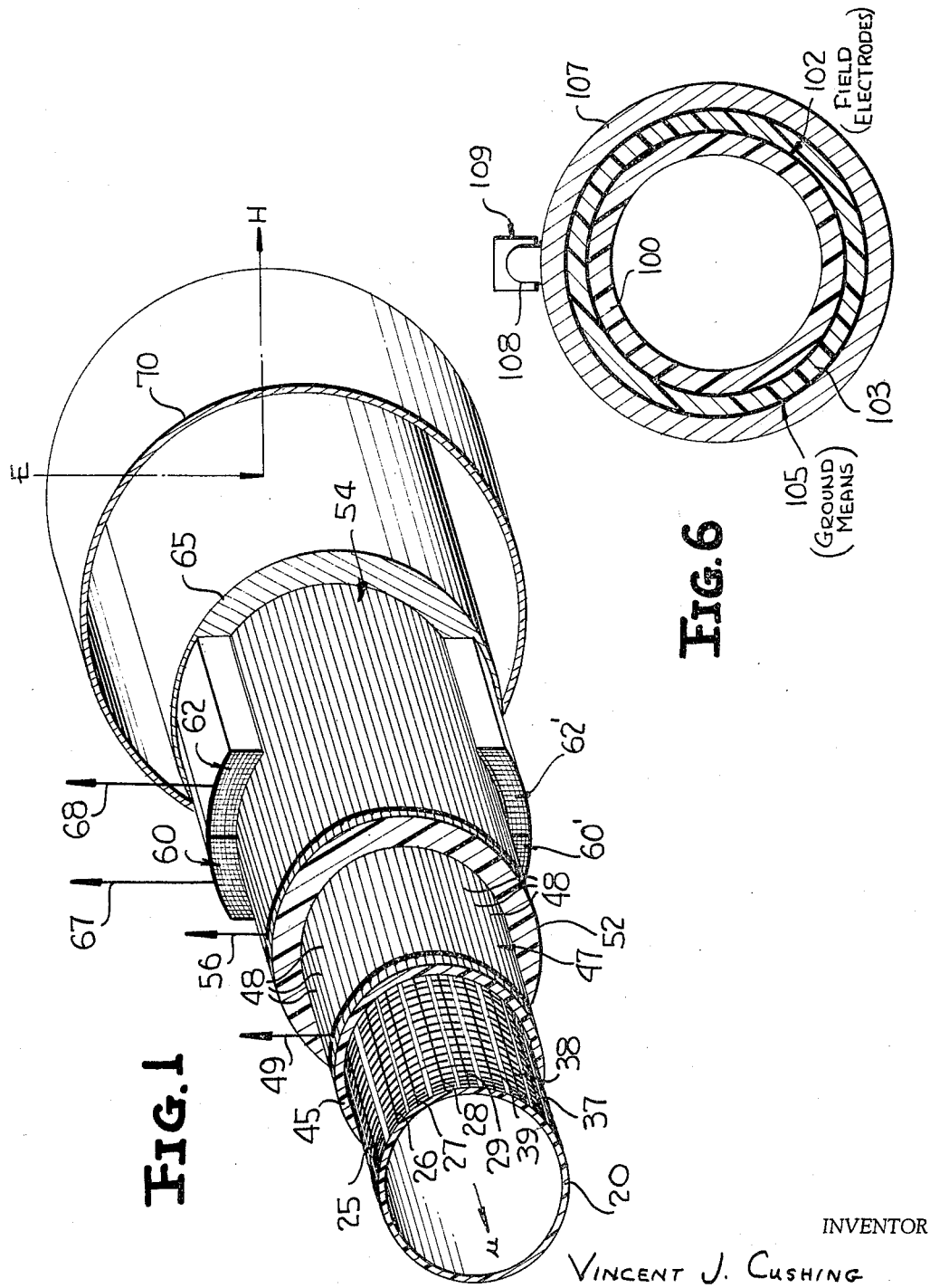
FIG. 1 is a broken away perspective view of one form of the invention.

Referring now to the drawings wherein like reference characters designate corresponding parts throughout the several views, the basic concepts of the present invention may be understood from the reference to FIG. 1 wherein the arrows indicate the relative directions of the transverse electric field E, the flow velocity $u$ and the induced magnetic field H. The magnetic field H induced by the fluid flowing through the transverse electric field within the conduit means is collected by the magnetic permeable material and measured by a suitable magnetic flux measuring device as hereinafter set forth.

In a dielectric medium where there are no electrical conduction currents, we have the following expressions for the divergence of the magnetic field H, $$\text{div } H = -\text{div } M \tag{1}$$

where M is the magnetic moment per unit volume. However, if a linear dielectric fluid is placed in an electrical field of intensity E, the polarization P is given by $$P = K_o(K-1)E \tag{2}$$

where $K_o$ is the permittivity of free space;

K is the dielectric constant of the flowing fluid. Furthermore, if the dielectric fluid is moving relative to the electric field E, a magnetic moment M per unit volume is induced; this magnetic moment is equal to vector cross product $$M = P \times u \tag{3}$$

where P is the vector polarization described by Equation 2;

$u$ is the velocity.

Since we are dealing with a magnetic configuration wherein there are no conduction currents, we may employ the scaler magnetic potential $\phi$, so that we have $$H = -\text{grad } \phi \tag{4}$$

Using Equations 1, 3 and 4 we obtain a Poison equation $$\nabla^2 \phi = \text{div } (P \times u) \tag{5}$$

Equation 5 is almost identical with Equation 24 of the inventor's publication, Review Scientific Instruments, 29, 692, (1958); Review of Scientific Instruments, 32, 225 (1961). Following the line of reasoning in the above-identified publication; we find that $$\nabla^2 \phi = -Pu'(r) \cos \theta \tag{6}$$

where $u'(r)$ is the derivative of $u(r)$;

P is the strength of polarization due to the applied, uniform transverse electric field.

Following the line of reasoning leading to Equation 32 of the above-cited publication, we analogously obtain the solution to Equation 6 above—it is $$\phi(r, \theta) = -\frac{P \cos \theta}{r} \int_0^r r u(r) dr \tag{7}$$

Actually, Equation 7 is a particular solution to Equation 6; to it we may add the solution of the homogeneous equation $$\nabla^2 \phi = 0 \tag{8}$$

Before adding such a general solution, however, we must establish the boundary conditions for our problem. In this analysis we will simply assume that the flowmeter pipe is wrapped with material of very high relative permeability $\mu$. This has the effect of establishing the following boundary condition on the scaler magnetic potential $$\phi(a,\theta)=0 \qquad (9)$$

That is to say, the magnetic scaler potential is zero at the walls of our flowmeter pipe. Using straightforward classical techniques one finds the solution which satisfies Equations 6 and 9 to be $$\phi(r,\theta) = -P \cos\theta \left[ \frac{1}{r}\int_o^r r u \, dr - \frac{F(r/a)}{2\pi a} \right] \qquad (10)$$

where total volumetric flow rate F is $$F = 2\pi \int_o^a r u \, dr \qquad (11)$$

Next we will determine the radial component of the magnetic field H along the wall of our pipe, i.e., at $r=a$. According to Equation 4, it is determined by $$H_r(a,\theta) = -\frac{\partial(a,\theta)}{\partial r} = -(PF \cos\theta)/\pi a^2 \qquad (12)$$

The radial component of the magnetic induction $B_r$ is, of course, simply given by $$B_r(a,\theta) = \mu_o H_r(a,\theta) = -\mu_o PF \cos\theta/\pi a^2 \qquad (13)$$

where $\mu_o$ is the permeability of free space.

Figure 3:
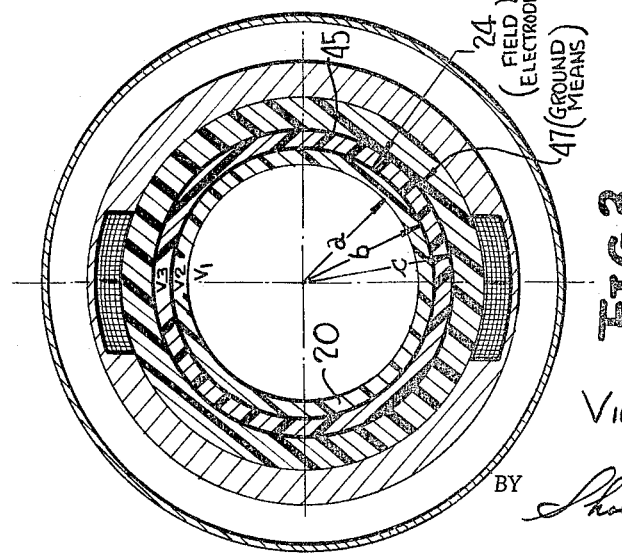
FIG. 3 is a cross-section through the first form of the invention shown in FIGS. 1 and 2.

Equation 13 is an expression for the flux density which crosses the wall of our flowmeter. Our ultimate goal is to find the total flux which is collected by the magnetic permeable material, and which therefore passes through the magnetic flux measuring device which we wish to utilize. Since the magnetic induction B is sinusoidal, the total flux which passes through our magnetic flux measuring instrument is clearly the same as the total flux which passes through the right half (or, alternatively, the left half) of the flowmeter cross section as indicated in FIG. 3. Thus the total flux threading our sensing loop is given by $$\Phi = -aL \int_{-\pi/2}^{\pi/2} B_r(a,\theta) d\theta = -2L\mu_o PF/\pi a \qquad (14)$$

where L is the length (parallel to the axis of the flowmeter) of the magnetic permeable material;
$\mu_o$ is the permeability of free space;
P is the polarization in the dielectric fluid due to the applied electric field;
F is the volumetric flowrate through the flowmeter;
$a$ is the interior radius of the flowmeter pipe.

Substitution of Equation 2 into Equation 14 yields finally $$\Phi = -2L(K-1)EF/\pi ac^2 \qquad (15)$$

where $c$ ($=\sqrt{1/\mu_o K_o}$) is the velocity of light, a physical constant.

From Equation 15 we see, then, that the magnetoelectric flowmeter generates a magnetic flux $\Phi$ which is linearly proportional to the volumetric flow rate of the dielectric fluid.

It should also be noted that the present invention may be utilized for ascertaining volumetric flow rate as discussed above, and additionally the fluid density can be determined with well-known techniques, and with these known quantities, the mass flow rate can be determined by carrying out in a suitable multiplying circuit the product of density and volumetric flow rate.

Referring now particularly to FIGS. 1-5 inclusive, a first form of the invention includes an elongated tubular conduit means 20 formed of a suitable dielectric material such as Teflon or the like, the fluid being adapted to flow through this conduit means. In a typical example, this conduit means may have an internal diameter of .75 inch to yield a desired average flow velocity of 30 feet per second. The over-all flowmeter may have an outer diameter of approximately 2 inches with a length of about 7 inches. It is, of course, evident that the size of the apparatus may be varied within wide limits, and the above-cited example is for the purpose of illustration only.

Means for producing a substantially uniform transverse electric field within the conduit means in a direction substantially perpendicular to the direction of fluid flow therethrough includes a plurality of field electrodes, a first electrode means 22 being illustrated as disposed about the outer upper periphery of the conduit means, while a second electrode means 24 is illustrated as being disposed about the lower outer periphery of the conduit means.

The electric field employed in the present invention must be kept below the dielectric strength or breakdown field for the dielectric fluid. Actually the applied electric field will be well below the random electric field strengths which naturally exist in a turbulently flowing dielectric fluid. Furthermore, the electric power required to energize the magnetoelectric flowmeter apparatus is extremely small, and accordingly the electric source must be designed so that it is unable to deliver an excessive quantity of electrical power in the event of electrical insulation breakdown in the circuitry of the flowmeter apparatus. The field electrode means in the present invention is isolated from the flowing fluid by the thickness of the conduit means which is Teflon, known to be an excellent dielectric material.

Any suitable means may be provided for producing a substantially uniform transverse electric field within the conduit means, and in the present invention a unique method is employed for accomplishing this purpose wherein a particular configuration of the field electrodes is provided. As seen especially in FIG. 4, a first longitudinally extending electrically conductive and non-magnetic field electrode includes a longitudinal portion 25 and a plurality of peripherally extending portions 25′, the portions 25′ being insulated from one another and being connected at their midpoints to the longitudinal conductive portion 25. A second field electrode includes a pair of longitudinal portions 26 disposed at equally spaced portions on either side of conductive portions 25, each of the longitudinally extending conductive portions 26 having a plurality of peripherally extending portions 26′ extending therefrom and substantially normally thereto and insulated from one another, each of the portions 26′ being connected at its midpoint to a longitudinally extending conductive portion 26. In a similar manner, a pair of longitudinally extending conductive portions 27 are positioned equidistantly on either side of conductive portion 25 and include peripherally extending conductive portions 27′. Longitudinally extending conductive portions 28 having the peripherally extending portions 28′ are arranged in a similar manner as are a pair of longitudinally extending conductive portions 29 having peripherally extending portions 29′ connected therewith. In other words, there are five (5) electrodes illustrated and as seen five (5) arrows indicate that these five electrodes are connected to an external source of electrical energy, a different potential being applied to the different electrodes as will hereinafter be more clearly understood.

The field electrode means 24 disposed on the lower outer periphery of the conduit means in a similar manner includes a plurality of longitudinally extending individual electrodes having peripherally extending portions connected therewith. Each of the peripherally extending portions 35′, 36′, 37′, 38′, and 39′ which correspond respectively with the peripheral portions 25′, 26′, 27′, 28′ and 29′ are clearly seen in FIG. 5, two of the longitudinally extending conductive portions 38 and 39 being visible in FIG. 4.

It will be noted that the peripherally extending portions of the various field electrodes effectively define a gridwork which has the additional advantage particularly at high frequency operation of reducing eddy currents and permitting the magnetic field to readily pass through the electric field electrodes, the peripherally extending portions extending through different peripheral distances or arcs as clearly seen in FIG. 5.

As a basis for discussing the actual electrode configuration to produce the desired transverse electric field, we should like to analyze first the potential field which exists within the flowing dielectric, as well as the potential field which exists in the surrounding dielectric pipe. FIG. 3 illustrates a cross-section of the magnetoelectric flowmeter where the interior radius of the pipe is "$a$." In terms of polar coordinates wherein $r$ represents the distance of a point from the longitudinal axis of the conduit, and wherein $\theta$ represents the angle from a horizontal line as seen in FIG. 3, passing through the longitudinal axis of the conduit, the potential field within the pipe will be described by $V_1(r,\theta)$. The Teflon liner 20 extends from $a \leq r \leq b$, and along the exterior surface of the Teflon liner radius $b$ is distributed a set of electrodes; the potential in this region will be described by $V_2(r,\theta)$. In the region $b \leq r \leq c$ is a fiberglass pipe 45 with a ground means 47 applied at radius $c'$ the potential in this region will be described by $V_3(r,\theta)$. This shield electrode is established at electrical ground potential in order to shield the detecting coil from the enerizing electrode voltages.

To determine $V_1$, $V_2$, and $V_3$ we note that these potentials all satisfy Laplace's equation $$\nabla^2 V_1 = 0 \quad (16a)$$

$$\nabla^2 V_2 = 0 \quad (16b)$$

$$\nabla^2 V_3 = 0 \quad (16c)$$

In addition, the boundary conditions on these differential equations are $$V_1(a,\theta) = V_2(a,\theta) \quad (17a)$$

$$\frac{\partial V_1}{\partial r}(a,\theta) = \frac{\partial V_2}{\partial r}(a,\theta) \quad (17b)$$

$$V_2(b,\theta) = V_3(b,\theta) \quad (17c)$$

$$\frac{\partial V_2}{\partial r}(b,\theta) = \frac{\partial V_3}{\partial r}(b,\theta) \quad (17d)$$

$$V_3(c,\theta) = 0 \quad (17e)$$

It is our objective to determine the required potential along the line $r=b$ (where our electrodes will be located) in order that we may have a uniform transverse electric field, $E$, in the interior region. That is to say, it is our objective to determine $V_2(b,\theta) = V_3(b,\theta)$ when we prescribe that, within the pipe $$E = -\text{grad}_y V_1 = -\partial V_1 / \partial y \quad (18)$$

where $E$ is a constant. Clearly, the solution to Equation 18 is $$V_1 = Ey \quad (19a)$$

From geometry it is more convenient to use polar coordinates so that Equation 19a becomes $$V_1 = Er \sin \theta \quad (19b)$$

Using classical methods of solution we find for $V_2$ and $V_3$ $$V_2(r,\theta) = [(1+K/K_t)(r/a) + (1-K/K_t)(a/r)](Ea/2) \sin \theta \quad (20a)$$

$$V_3(r,\theta) = [(c^2-r^2)/(c^2-b^2)](b/r)[(1+K/K_t)(b/a) + (1-K/K_t)(a/b)](Ea/2) \sin \theta \quad (20b)$$

where $K$ is the dielectric constant of the metered fluid; $K_t$ is the dielectric constant of the Teflon liner.

Equations 20a and 20b show that along any circular boundary the potential varies as $\sin \theta$, and it will be our objective to design an electrode configuration at radius $r=b$ which will satisfactorily approximte this requirement.

Since we prefer a minimum number of electrodes at different potentials approximating the $\sin \theta$ distribution, we are interested in knowing whether two properly contoured electrodes would give the required uniform electric field within the flowmeter pipe. Equations 20a and 20b can be considered to be the electrode contour expressed in polar coordinates; that is to say, for any prescribed value of $V_2(r,\theta)$=constant or $V_3(r,\theta)$=constant, these equations express the requirement implictly for $r$ as a function of $\theta$. Clearly, however, we see that the required contour is not invariant with changes in the fluid's dielectric constant, $K$, and hence in principle it would be impossible to precisely construct a two electrode configuration which would be workable for fluids with a wide variety of dielectric constants.

If the flowmeter is restriced to conditions of very high Reynolds number, such as does indeed exist in plumbing practices attendant to rocket engines, then the flow velocity profile does not change appreciably over very wide differences in flowrate; in consequence, a non-uniform actuating field would contribute relatively little error due to flow profile change. Therefore, it will be satisfactory, particularly in connection with high Reynolds number rocket plumbing systems, to approximate the uniform transverse actuating field.

The continuous actuating electrodes at $r=b$ are articulated into 18 segments. To attain a satisfactory strength of flow signal we assume a maximum applied potential of 2500 volts (R.M.S.) with respect to ground. As a maximum, we assume that we will have five electrodes on each quadrant. The remaining problem then is to select the potential values, the electrode size and their locations.

For insulation purposes we would prefer a constant potential difference between adjoining electrodes. Since this implies 500 volts difference we must first insure adequate gaps. Assuming the worst possible tolerances and insulating condition, we should have approximately .007 inch separation between segments. The electrodes are on the surface of a tube with a circumference of about 2.5 inches and we therefore provide approximately 1° spacing.

For the desired uniform field in the vertical direction we would ideally apply at each point a potential $$V = C(Ea \sin \theta)$$

where $C$ is a constant whose value depends on the fluid and the meter geometry [see Equations 20a and 20b]. Letting $P_n$ represent the electrodes, with $P_5$ representing the top one (located at $\pi/2$) at potential $CEa$, for uniform potential difference the other electrodes $P_n$ must be at $(n/5)CEa$. If we assume the gaps are located at the points on the circumference where the ideal potential value should be the mean between the electrode potentials, the points $P_n$ and the gaps are uniquely located. This distribution is illustrated in FIG. 5. In this configuration, the larger plates are at the top and bottom where the change in separations due to curvature is minimum.

Figure 2:
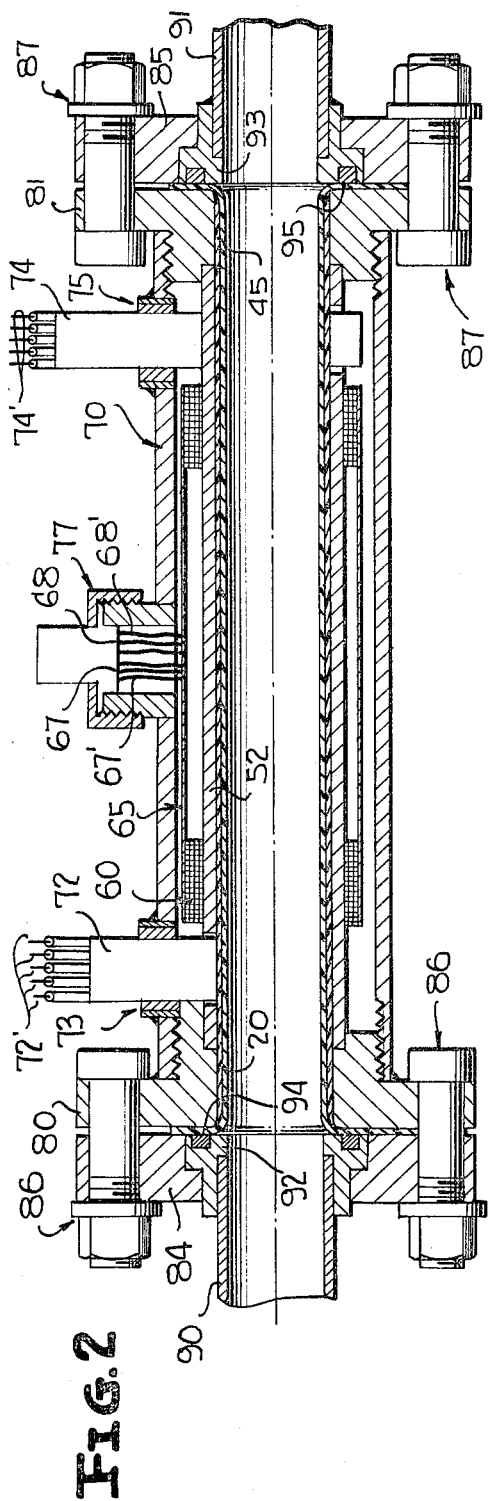
FIG. 2 is a longitudinal section through a complete flowmeter a portion of which is shown in FIG. 1.
Figure 11:
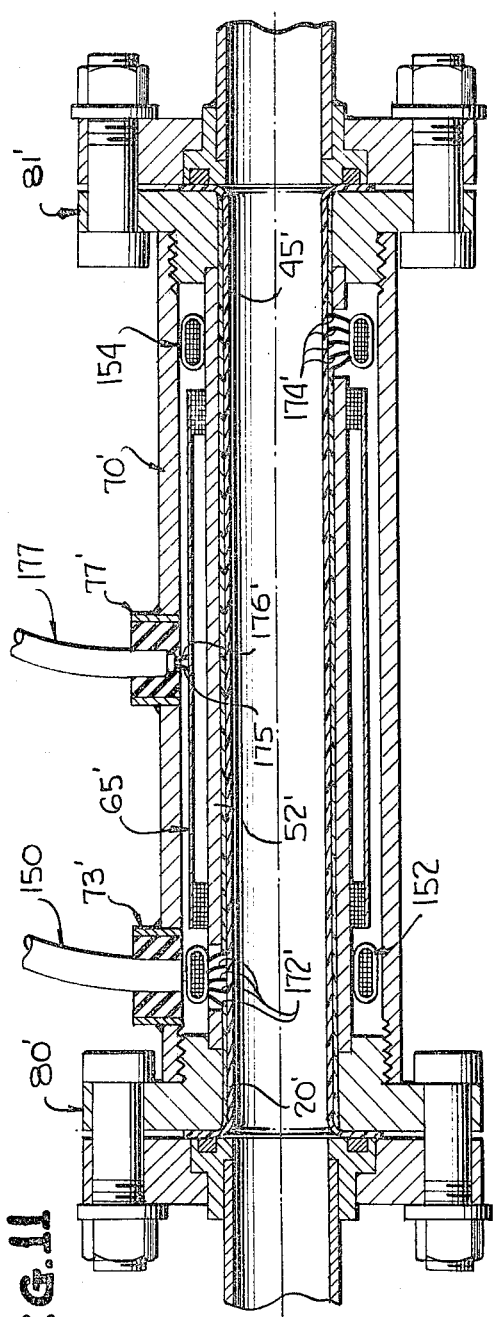
FIG. 11 is a longitudinal cross-sectional view of a modified form of the invention incorporating an internal transformer arrangement.

For electrical symmetry of the flowmeter we would prefer to apply the voltage to these electrodes at their mid-points. However, the detecting coils make this a most inaccessible location. We have therefore applied the voltage to one end of the top plates and to the other end of the bottom plates. These applied voltages are tapped from a transformer which may be external, in which case we require ten separate wires entering the meter with up to 2500 volts potential. This configuration is shown in FIG. 2. A preferred scheme is to incorporate the transformer into the flowmeter using a toroid on each end. This design requires only two low voltage wires entering the meter. FIG. 11 illustrates this design concept.

Finally, it should be noted that the electrodes discussed above may be actually grids made up of approximately .005 inch wires with comparable spacing. This construction is desirable so that the induced magnetic field may pass through to the magnetic high μ circuit (which passes around the sensing coil) without inducing excessive eddy currents in the electrodes. These grids may be photo-etched on copper-clad Teflon sheets and applied to the Teflon tube.

As seen in FIG. 5, a plurality of lines have been drawn from the center of the conduit means through the central portions of the gaps between the adjacent peripherally extending portions of the various field electrodes, and the angles defined by these lines with a horizontal line are indicated respectively by the letters $a$, $b$, $c$, $d$, and $e$. In the example as discussed above, these angles may be as follows:

a. 64°10′,
b. 44°26′,
c. 30°,
d. 17°27′,
e. 6°15′.

This novel configuration of the field electrodes ensures that a substantially uniform electric field of constant magnitude and direction will be provided within the conduit means transverse or substantially perpendicular to the direction of fluid flow within the conduit means. It will also be noted that the field electrodes are substantially curvilinear in configuration and extend through a relatively large area as compared to the over-all dimensions of the apparatus. The grid-like construction will minimize any eddy current losses and further minimize any disturbance to the induced magnetic field, although it is possible to use non-grid-like sheets or foils particularly at low frequency operation provided the foil thickness is small compared with eddy current skin depth.

Referring again to FIG. 1, it will be noted that the tubular member 45 of dielectric material is disposed in closely surrounding relationship to the field electrodes mounted on the exterior of the conduit means 20, and the ground means 47 is mounted on the exterior of tubular member 45. The ground means 47 includes a plurality of individual longitudinally extending portions 48 formed of electrically conductive non-magnetic material such as copper or the like, these longitudinally extending portions 48 being spaced from and insulated from one another and being connected at certain points by a peripherally extending conductive portion 49 which in turn may extend externally of the apparatus to grounds. The ground means may be formed by the same techniques as employed in forming the field electrodes, it being noted that the ground means is of such a nature as to also define a gridwork which serves to minimize eddy current losses and to provide a minimum of interference with the induced magnetic field. It will be noted that the ground means defines a substantially curvilinear configuration of relatively large area and that the ground means is additionally disposed substantially completely around in surrounding relationship to the conduit means and the field electrode means. The opposite portions of the ground means 47 may be spaced from one another so as not to provide a closed loop. It is of course evident that the ground means is spaced from and insulated from the field electrodes and is disposed substantially concentric therewith.

A tubular member 52 which is also preferably formed of a dielectric material such as fiberglass is disposed in surrounding relationship to the ground means 47 mounted on tubular member 45, member 52 serving to strengthen the flowmeter apparatus. A second ground means 54 may be mounted upon the outer surface of tubular member 52, the construction and arrangement of ground means 54 being substantially identical with ground means 47 previously described. As in the previously described ground means, the longitudinally extending portions of ground means 54 are spaced and insulated from one another, these various longitudinally extending portions being interconnected at certain points by a peripherally extending conductive portion 56 which has the opposite ends thereof spaced from one another so as not to form a closed loop and further which may extend outwardly of the apparatus and be connected to ground.

The magnetic sensing means of the modification illustrated in FIGS. 1 through 5 includes a pair of continuous induction coils, one of the coils including upper and lower halves 60 and 60′, the other coil including upper and lower halves 62 and 62′ respectively. It will be understood that the upper and lower halves of each of the coils extend longitudinally along the length of the conduit means disposed therewithin and that the intermediate portions of each of the coils is wrapped around the tubular member 52 from the upper portion to the lower portion thereof. This type of induction coil is of relatively conventional construction and will be well understood to one skilled in the art.

The magnetic sensing means includes a body 65 formed of magnetic permeable material such as silicon steel, this magnetic permeable material body means extending substantially completely around the components previously described and disposed therewithin and serving to collect the magnetic flux produced by the fluid flowing through the transverse electric field. A pair of leads 67 and 68 indicate output leads from the induction coils which may be connected with a suitable electrical circuit as hereinafter described for providing the desired indication of the amount of flux generated by the fluid flowing through the conduit means.

The entire assembly as previously set forth is finally encased within a casing 70 which may be formed of any suitable material such as aluminum or the like, this casing serving to support and protect the components disposed therewithin.

Referring particularly to FIG. 2, a first cable means 72 extends through a suitable fitting 73 mounted in the casing and includes five leads 72′ which are similarly identified in FIG. 4 which are connected to the various field electrodes previously described. In a similar manner, a cable 74 extends through a fitting 75 and includes a plurality of leads 74′ which are connected with the leads similarly identified in FIG. 4 connected with various others of the field electrodes.

The output leads 67 and 68 from the induction coils of the magnetic sensing means extend outwardly through a suitable fitting 77 provided on the casing 70, and may be surrounded by tubular ground shield means indicated schematically at 67′ and 68′.

The opposite ends of tubular member 52 may be supported within fittings 80 and 81 which are respectively mounted as by threads in the opposite ends of casing 70. Portions 80 and 81 are in turn operatively connected with annular clamping potrions 84 and 85 by means of nut and bolt assemblies 86 and 87 respectively. The end portions 90 and 91 of adjacent pipe members or conduits are supported within annular members 92 and 93 which in turn are supported within members 84 and 85 as illustrated. Portions 92 and 93 are provided with annular grooves within which are disposed sealing members 94 and 95 respectively. It will be noted that the opposite ends of the Teflon conduit means 20 are clamped between the members 80 and 81 and the adjacent portions of members 84, 92 and 85, 93 with the sealing portions 94 and 95 ensuring an effective fluid-tight seal therebetween.

Referring now to FIG. 6 of the drawings, a modified form of the invention is illustrated wherein the conduit means 100 is similar to the conduit means previously described and is formed of a dielectric material such as Teflon or the like. Field electrode means indicated at 102 is mounted on the outer periphery of the conduit means and may be formed substantially identically with the previously described field electrodes.

A tubular member 103 formed of material such as Teflon is disposed in surrounding relationship to the field electrodes and has mounted on the outer periphery thereof a ground means indicated at 105, this ground means being constructed substantially identically with the previously described ground means.

The ground means is in turn surrounded by a member 107 of magnetic permeable material such as soft iron which serves as a flux collecting means. This body of flux collecting material may be necked down as indicated schematically at 108 so that the total flux becomes concentrated or in other words the flux density is increased. A magnetic flux measuring device is indicated schematically at 109 and in this particular instance may comprise a conventional magnetometer which is schematically illustrated in FIG. 7 of the drawings. In this particular modification, the source of electrical energy may be either A.C. or D.C. in contrast to the previously described modification which requires an A.C. source of electrical potential.

As illustrated in FIG. 7, the necked down portion 108 of the magnetic permeable material serves as a core for a transformer and four coils $C_1$, $C_2$, $D_1$ and $D_2$ are wound around this necked down portion. Coils $C_1$ and $C_2$ are energized by an A.C. generator 112 of constant amplitude, and as is well known, the output voltage $E_o$ as seen in FIG. 7 has a frequency which is the second harmonic of the actuating A.C. generator, and of a magnitude which is directly proportional to the magnetic flux passing through the necked down portion of the magnetic permeable material about which the four coils are wound. This output voltage $E_o$ can be filtered, amplified and rectified in a conventional manner so as to obtain a desired measurement of the magnetic flux. The output voltage $E_o$, which is directly proportional to the total magnetic flux generated by the flowmeter, is directly proportional to the volumetric flowrate of the dielectric fluid passing through the apparatus.

In order to obtain optimum operation of the apparatus as described hereinbefore, the flow velocity profile of the flowing fluid should be substantially axially symmetric. To obviate the problem of asymmetric flow, means may be employed for producing a uniform but rotating transverse electric field. It is possible to effect rotation of the electric field by mechanically rotating the actuating electrical gridworks, but it is felt that a more practical arrangement is one wherein the electric field can be produced by electrical means. The advantage of utilizing a rotating electric actuating field is that the electric field can be made to make one complete revolution in a very short period of time since the electric field rotates at the frequency of alternation of a two-phase energizing generator. Therefore, the time for one complete revolution of electric field can be made sufficiently short such that the flow velocity profile may be considered frozen during the short time interval. In this manner, the rotating electric field effectively averages out all flow velocity asymmetries and it is no longer necessary to have a substantially axially symmetric profile within the conduit means.

Figure 8:
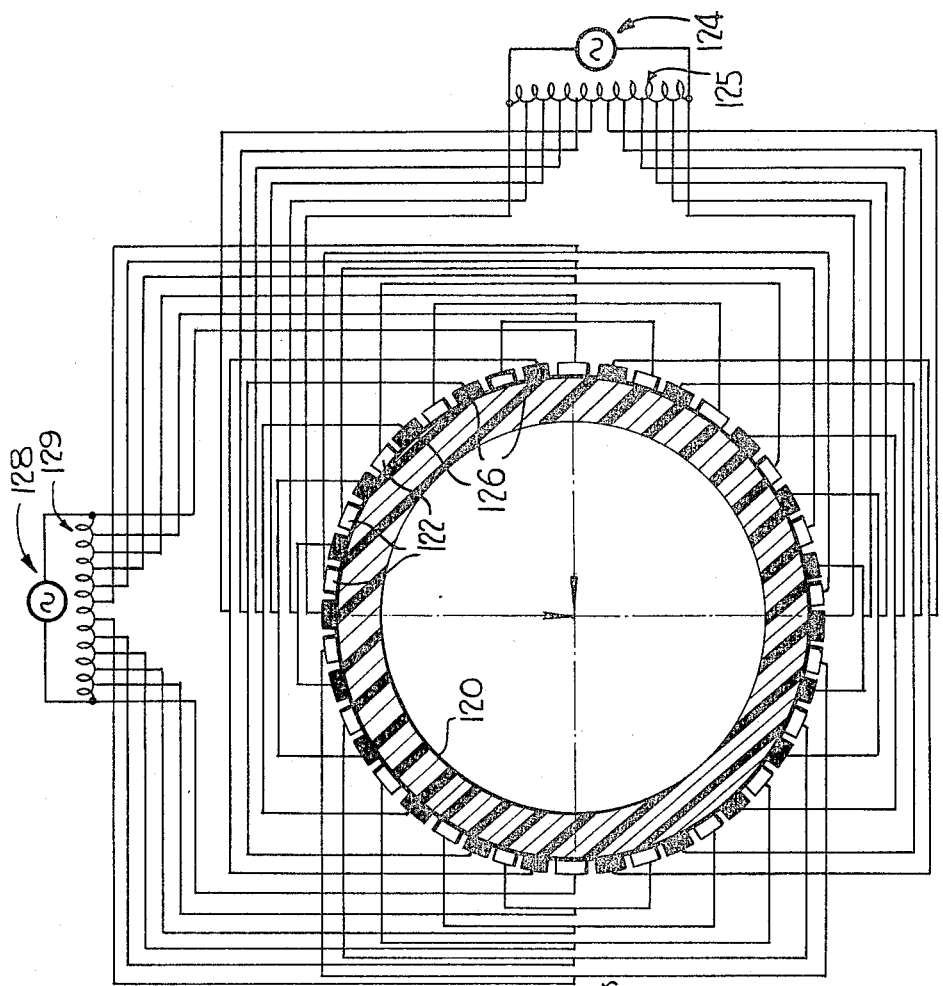
FIG. 8 is a schematic wiring diagram illustrating the manner in which the field electrodes are arranged to provide a rotating field.

Referring to FIG. 8, the method of producing the rotating electric field is illustrated. As seen in this figure, a conduit means 120 formed of a suitable dielectric material such as Teflon or the like is provided with a first set of longitudinally extending field electrodes 122 which may be of substantially identical construction with the field electrodes 22 previously discussed. A second plurality of longitudinally extending field electrodes 126 are mounted upon the outer periphery of the conduit means 120 and are disposed in alternating arrangement with the electrodes 122 as will be clearly understood. A pair of generators 124 and 128 are provided, these generators being of suitable frequency and electrically in quadrature with one another. The field electrodes 122 are energized by generator 128 and are tapped off of a coil 129 so as to provide the proper voltages on the various field electrodes. In a similar manner, the field electrodes 126 are energized by generator 124 and are tapped off of a coil 125 to provide suitable voltages thereon.

The generators produce alternating electric fields at right angles to one another and which are mutally perpendicular to the direction of flow of fluid through the conduit means. The entire induced magnetic field in such a two-phase system rotates at the frequency of the actuating electric field. Accordingly, as illustrated in FIG. 9, a pair of magnetic sensing devices 132 and 133 are provided for detecting the magnetic flux. As seen in FIG. 9, a tubular member 135 of Teflon or the like is disposed in surrounding relationship to the field electrodes 122, 126 and has a ground means indicated at 136 mounted on the outer periphery thereof. The ground means is in turn surrounded by a body 137 of magnetic permeable material which is necked down as indicated at portions 132' and 133' so as to concentrate the magnetic flux adjacent the magnetic sensing devices.

Referring now to FIG. 10 of the drawings, an apparatus substantially identical with that shown in FIG. 9 is illustrated wherein corresponding parts have been given the same reference numerals primed, the only difference in the modification illustrated in FIG. 10 being that four flux measuring devices are employed rather than two thereby doubling the sensitivity of the magnetic sensing means. In the arrangement shown in FIG. 10, the outputs of the devices 140 and 141 disposed at diametrically opposite portions of the apparatus are added to one another while the outputs of devices 142 and 143 disposed at opposite portions of the device are also added to one another.

Referring now to FIG. 11 of the drawings, a modified form of the invention is illustrated which as is evident is quite similar in construction to the modification illustrated in FIG. 2. Similar components have been given the same reference numerals primed in the modification illustrated in FIG. 11 as the corresponding elements in the modification illustrated in FIG. 2. It is apparent that the general organization and relative relationship of the components is identical with that shown in FIG. 2, the major distinction lying in the manner in which the voltages applied to the field electrodes are obtained from the power source. In the modification shown in FIG. 2, the voltages are tapped from an external transformer, while in the modification shown in FIG. 11, an internal transformer is incorporated within the casing means 70'.

The input cable 150 extends through a fitting 73', cable 150 including a pair of low voltage wires which are connected with a first toroidal transformer 152 provided about one end portion of tubular member 52'. The low voltage input wires are also connected with a second toroidal transformer 154 mounted about the opposite end of the tubular member 52'. A first plurality of leads 172' corresponding to the leads 72' as illustrated in FIG. 4 of the drawings are connected with the secondary of the first toroidal transformer 152, these leads 172' being connected with the longitudinally extending field electrodes provided on the upper outer periphery of the conduit means 20'. In a similar manner, the secondary of the toroidal transformer 154 is connected by means of a plurality of leads 174' corresponding to the leads 74' as shown in FIG. 4 with the longitudinally extending field electrodes provided on the lower outer periphery of the conduit means 20'. A pair of output leads 175 and 176 are provided, these output leads extending through an output cable 177 which extends outwardly through a fitting 77' provided in the casing.

Turning now to FIG. 12 of the drawings, an electrical circuit is diagrammatically illustrated for use in connection with the flowmeter illustrated in FIGS. 1–5 of the drawings. As seen in FIG. 12, the flowmeter structure as has been previously described is illustrated schematically by a flowmeter indicated by reference numeral 180 and a flux sensing means illustrated schematically and indicated by reference numeral 182. A suitable source of A.C. potential is indicated at 184 and may comprise any conventional form of A.C. generator which is designed to operate at a suitable frequency and voltage. In this particular arrangement, a steady transverse alternating electric field (of constant R.M.S. intensity) induces an alternating magnetic flux of the same frequency as that of the actuating electric field. This alternating magnetic flux threads the sensing coil and induces in the coil a voltage V of a magnitude described by $$V = -Nd\Phi/dt \qquad (21)$$

where N is the number of turns in the sensing coil;

$d\Phi/dt$ is the rate of change of magnetic flux. Substitution of Equation 15 into Equation 21 yields $$V = 2i\omega LN(K-1)EF/ac^2 \qquad (22)$$

where we use the complex notation $i\omega\Phi = d\Phi/dt$. Thus we see that the voltage generated in the sensing coil is in time quadrature with the actuating electric field, is proportional to the frequency of the actuating electric field, and proportional to the number of turns in the sensing coil.

The use of an alternating actuating electric field in connection with a sensing coil provides a very sensitive technique for measurng the induced magnetic flux. However, it must be pointed out that the alternating polarization set up by such an alernating elecric field in the magneoelectric flowmeter gives rise to polarization currents in the dielectrc fluid, and these polarization currents set up a "hum." This hum can in principle be nulled by symmetric arrangement of all components, although it must be admitted as a practical matter that perfect nulling is difficult, and therefore one must resort to phase-sensitive detection so as to accept the flow induced signal while discriminating against or rejecting the hum voltage, which is in time quadrature with the flow induced signal.

Referring again to FIG. 12, it will be noted that the output of the flux sensing means 182 is connected with an implifier 186. A hum compensator 188 is connected with the flux sensing means 182 and the amplifier 186 so as to provide the desired hum compensation. The output of the amplifier is in turn connected with a conventional phase sensitive detector 190 which in turn has the output thereof connected with a suitable display device 192 for providing the desired indication of the flux which as has been pointed out previously is proportional to the volumetric flow rate of the fluid through the apparatus.

It should be noted that the thickness of the collecting means in each modification may be substantially less than that of the associated conduit means, and in a typical example may have a thickness on the order of a few thousandths of an inch.

It is apparent from the foregoing that there is provided, according to the present invention, new and novel magnetoelectric flowmeter apparatus which is adapted to be utilized particularly with dielectric fluids. The apparatus employs no moving parts and provides an unobstructed flow passage for the metered fluid. In addition, the apparatus produces virtually no pressure drop in the measured fluid, the device has a substantially linear response, and further is extremely sensitive to flow oscillations. Means is provided in certain modifications of the invention to eliminate the problem of asymmetric fluid flow by providing a rotating electric field in combination with spaced magnetic sensing means. Means is provided for collecting and measuring substantially all of the magnetic flux developed by the apparatus, and further means is provided for shielding and protecting the magnetic flux collecting and measuring means from any deleterious effects which might be created by the electric field. It is apparent that the construction of the present invention is quite simple and inexpensive and further is compact, and yet at the same time the apparatus is quite efficient and reliable in operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

What is claimed is:

1. Magnetoelectric flowmeter apparatus comprising conduit means of dielectric material through which fluid is adapted to flow, means adjacent said conduit means for producing an electric field within said conduit means with said electric field disposed substantially transverse to the direction of fluid-flow through said conduit means, and magnetic sensing means adjacent said conduit means for sensing the magnetic flux created by fluid flowing within said conduit means and passing through said electric field, said magnetic sensing means providing an output indicative of fluid flow rate.

2. Magnetoelectric flowmeter apparatus comprising a tubular member of dielectric material through which fluid is adapted to flow, means adjacent said tubular member for providing a substantially uniform electric field of substantially constant magnitude and direction with said field disposed substantially normally to the direction of fluid flow through said tubular member, and magnetic sensing means disposed adjacent said tubular member and spaced from said means for producing said electric field, said magnetic sensing means being adapted to sense the magnetic flux created by fluid flowing through said tubular member and passing through said electric field, said magnetic sensing means providing an output indicative of fluid flow rate.

3. Magnetoelectric flowmeter apparatus comprising conduit means of dielectric material through which fluid is adapted to flow, a plurality of field electrodes disposed adjacent said conduit means, means for impressing an electrical potential on said electrodes for producing a substantially uniform electric field within said conduit means and extending transverse to said conduit means and the direction of fluid flow through said conduit means, and magnetic sensing means disposed adjacent to and outwardly of said electrodes for sensing the magnetic flux created by fluid flowing through said conduit means and passing through said electric field, said magnetic sensing means providing an output indicative of fluid flow rate.

4. Apparatus as defined in claim 3 wherein said magnetic sensing means includes means for collecting the magnetic flux comprising a body means formed of magnetic permeable material extending through a relatively large area.

5. Magnetoelectric flowmeter apparatus comprising an elongated conduit means formed of dielectric material, a plurality of electrodes disposed adjacent said conduit means and extending longitudinally thereof, said electrodes being formed of non-magnetic material, means for impressing an electrical potential on said electrodes for producing a substantially uniform electric field within said conduit means and extending substantially perpendicular to the direction of fluid flow through said conduit means, and magnetic sensing means disposed adjacent to and spaced from said electrodes for sensing the magnetic flux created by fluid flowing within said conduit means and passing through said electric field, said magnetic sensing means including flux collecting means comprising a body means extending throughout a substantial area and formed of magnetic permeable material, said magnetic sensing means providing an output indicative of fluid flow rate.

6. Magnetoelectric flowmeter apparatus comprising an elongated tubular conduit means formed of dielectric material through which fluid is adapted to flow, a plurality of field electrodes spaced and insulated from one another throughout the major portions thereof, said field electrodes extending longitudinally and outwardly of said conduit means and being fromed of non-magnetic material, said electrodes including portions extending peripherally of said conduit means in a direction substantially perpendicular to the longitudinal dimension of said conduit means, said peripherally extending portions of different ones of said electrodes extending through different peripheral distances, means for impressing an electric potential on said electrodes for producing a substantially uniform electric field within said conduit means in a direction transverse to the longitudinal dimension thereof, and magnetic sensing means disposed outwardly of and spaced from said electrodes, said magnetic sensing means including a portion of substantial area formed of magnetic permeable material for collecting flux, said magnetic sensing means being adapted to sense the magnetic flux created by fluid flowing within said conduit means and passing through said electric field, said magnetic sensing means providing an output indicative of fluid flow rate.

7. Apparatus as defined in claim 6 wherein said magnetic sensing means includes means for concentrating the magnetic flux in a particular area so as to facilitate sensing of the flux.

8. Magnetoelectric flowmeter apparatus comprising an elongated hollow conduit means formed of dielectric material through which fluid is adapted to flow, a plurality of field electrodes, certain ones of said electrodes being spaced and insulated from one another, each of said electrodes extending longitudinally along the outer portion of said conduit means and being formed of non-magnetic material, each of said electrodes including a longitudinally extending portion and a plurality of peripherally extending portions which extend substantially normally to said longitudinally extending portion, said peripherally extending portions of each of said electrodes being spaced and insulated from one another, certain ones of said peripherally extending portions extending peripherally a greater distance than others of said peripherally extending portions, said electrodes each defining a substantially curvilinear over-all configuration, means connected with said field electrodes for producing an electric field within said conduit means with said electric field disposed substantially transverse to the direction of fluid-flow through said conduit means, magnetic sensing means disposed outwardly of and in substantially surrounding relationship to said conduit means and said field electrodes, said magnetic means being disposed adjacent said conduit means for sensing the magnetic flux created by fluid flowing within said conduit means and passing through said electric field, said magnetic sensing means including a major portion formed of magnetic permeable material for collecting magnetic flux, said major portion being substantially curvilinear in configuration, said magnetic sensing means providing an output indicative of fluid flow rate.

9. Apparatus as defined in claim 8 wherein said electrodes include a first pair of electrodes for producing an electric field in one direction and a second pair of electrodes for producing an electric field in a direction in quadrature with said first electric field, means for alternately energizing said pairs of electrodes for effectively producing a rotating field, said magnetic sensing means including a plurality of spaced sensing means for sensing the magnetic flux created by fluid flowing through said conduit means and passing through said rotating electric field.

10. Magnetoelectric flowmeter apparatus comprising conduit means of dielectric material through which fluid is adapted to flow, field electrode means disposed adjacent said conduit means for producing a substantially uniform electric field within said conduit means and transverse thereto, magnetic sensing means disposed in spaced relationship to said field electrode means for sensing the magnetic flux created by fluid flowing within said conduit means and passing through said electric field, and ground means interposed between said field electrode means and said magnetic sensing means for shielding the sensing means from any deleterious effects of the electric field, said magnetic sensing means providing an output indicative of fluid flow rate.

11. Apparatus as defined in claim 10 wherein said ground means includes a plurality of portions of electrically conductive non-magnetic material, said portions extending in a direction substantially parallel with the length of said conduit means, said portions being connected together at certain points.

12. Magnetoelectric flowmeter apparatus comprising an elongated tubular conduit means of dielectric material, a plurality of field electrodes disposed adjacent said conduit means and spaced around the periphery thereof, said electrodes extending longitudinally of said conduit means and being formed of electrically conductive non-magnetic material, means connected with said field electrodes for producing an electric field within said conduit means with said electric field disposed substantially transverse to the direction of fluid-flow through said conduit means, magnetic sensing means disposed adjacent to but spaced outwardly of said conduit means and said field electrodes, for sensing the magnetic flux created by fluid flowing within said conduit means and passing through said electric field, said magnetic sensing means including flux collecting means comprising body means formed of magnetic permeable material extending through a relatively large area, and ground means interposed between and spaced from said field electrodes and said magnetic sensing means, said ground means being insulated from said field electrodes and said magnetic means and being formed of electrically conductive non-magnetic material, said magnetic sensing means providing an output indicative of fluid flow rate.

13. Apparatus as defined in claim 12 wherein said ground means includes a plurality of portions extending in a direction substantially parallel with the length of said conduit means and the major parts of said portions being insulated from one another, said longitudinally extending portions of the ground means being connected to one another at certain points.

14. Magnetoelectric flowmeter apparatus comprising an elongated tubular conduit means formed of dielectric material, a plurality of field electrodes spaced and insulated from one another and disposed about the outer periphery of said conduit means, means for impressing an electric potential on said electrodes for producing a substantially uniform electric field within said conduit means extending in a direction transverse to the flow of fluid through said conduit means, said field electrodes extending longitudinally of said conduit means and being formed of non-magnetic material, magnetic sensing means disposed adjacent to and spaced from said conduit means and said field electrodes for sensing the magnetic flux created by fluid flowing within said conduit means and passing through said electric field, said magnetic sensing means including body means formed of magnetic permeable material for collecting flux, said body means of magnetic permeable material being disposed in substantially completely surrounding relationship to said conduit means, and ground means being disposed between said field electrodes and said magnetic sensing means, said ground means being spaced from and insulated from said field electrodes and magnetic sensing means, said ground means being disposed in substantially surrounding relationship to said conduit means and including a plurality of longitudinally extending portions formed of electrically conductive non-magnetic material, said portions being spaced and insulated from one another throughout the major part thereof, said longitudinally extending portions of the ground means being interconnected with one another at certain points, said magnetic sensing means providing an output indicative of fluid flow rate.

15. Apparatus as defined in claim 14 wherein said ground means includes a plurality of substantially concentric ground means, said concentric ground means being spaced from one another and each being interposed between said field electrodes and said magnetic sensing means.

16. Apparatus as defined in claim 14 wherein each of said field electrodes, said ground means and said body means of magnetic permeable material are of substantially curvilinear configuration and extend through a relatively large area.

17. Magnetoelectric flowmeter apparatus comprising an elongated tubular conduit means formed of dielectric material through which fluid is adapted to flow, field electrode means comprising a plurality of electrodes formed of electrically conductive non-magnetic material, each of said electrodes including a plurality of elongated portions and a plurality of peripherally extending portions which extend transversely of said longitudinally extending portions, certain ones of said longitudinally extending portions and said peripherally extending portions being spaced and insulated from one another, means for impressing an electric potential on said field electrodes for producing an electric field within said conduit means of substantially constant magnitude and direction which is substantially perpendicular to the direction of fluid flow through said conduit means, magnetic sensing means disposed adjacent to and in spaced insulated relationship to said field electrodes and said conduit means for sensing the magnetic flux created by fluid flowing within said conduit means and passing through said electric field, said magnetic sensing means including a body of magnetic permeable material disposed in substantially surrounding relationship to said conduit means, ground means disposed between said field electrodes and said magnetic sensing means, said ground means being formed of non-magnetic material and being electrically conductive and further being spaced from and insulated from each of said field electrodes and said magnetic sensing means, said ground means including a plurality of portions which are insulated from one another throughout the major parts thereof and which are connected at certain points, said longitudinally extending portions of the ground means extending substantially parallel with the length of said conduit means whereby said ground means shields the magnetic permeable material and the magnetic flux sensing means from any deleterious effects of the electric field and further reduces eddy current losses, said magnetic sensing means providing an output indicative of fluid flow rate.

18. Apparatus as defined in claim 17 wherein said magnetic sensing means includes an induction coil and said body of magnetic permeable material is disposed in surrounding relationship to said induction coil.

19. Apparatus as defined in claim 17 wherein said field electrodes comprise a first pair of electrodes for producing an electric field in one direction and a second pair of electrodes for producing an electric field in another direction substantially normally to the direction of said first electric field, means for alternately energizing said pairs of electrodes in sequence so as to effectively produce a rotating electric field within said conduit means, said magnetic sensing means including a plurality of magnetic sensing means peripherally spaced about said conduit means for sensing the magnetic flux created by fluid flowing within said conduit means and passing through said rotating electric field.

No references cited.

RICHARD C. QUEISSER, *Primary Examiner.*

LAWRENCE R. FRANKLIN, *Assistant Examiner.*